W. L. JOHNSON.
GENERATING STEAM.
APPLICATION FILED APR. 7, 1911.
1,005,711.
Patented Oct. 10, 1911.
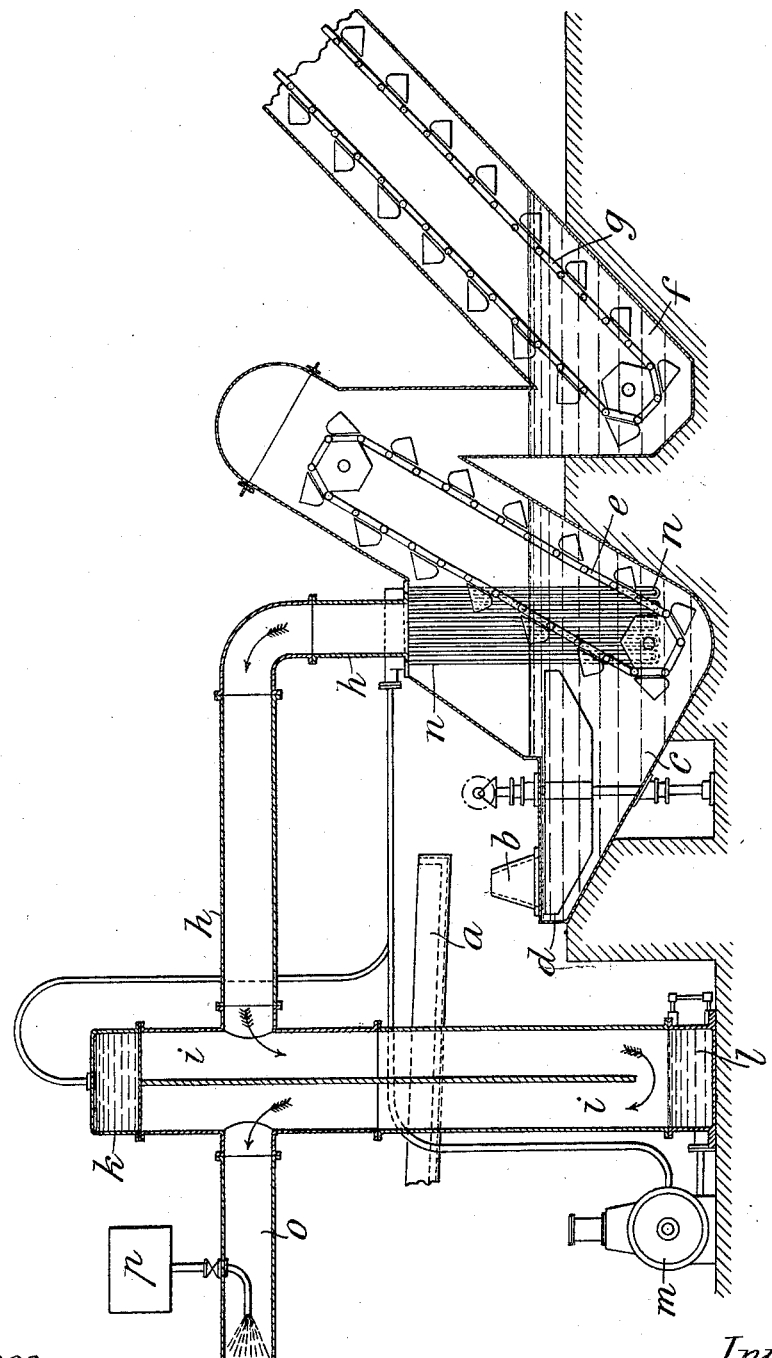
Witnesses
Inventor

UNITED STATES PATENT OFFICE.

WALTER LYULPH JOHNSON, OF MIDDLESBROUGH, ENGLAND, ASSIGNOR OF ONE-HALF TO BELL BROTHERS, LIMITED, OF MIDDLESBROUGH, ENGLAND.

GENERATING STEAM.

1,005,711.      Specification of Letters Patent.      Patented Oct. 10, 1911.

Application filed April 7, 1911. Serial No. 619,564.

*To all whom it may concern:*

Be it known that I, WALTER LYULPH JOHNSON, a subject of the King of Great Britain, residing at Clarence Iron Works, Middlesbrough, England, have invented a new and useful Improvement in Generating Steam, of which the following is a specification.

This invention relates to an improved method of generating steam by pouring molten slag into water.

In the methods heretofore in use for utilizing the waste heat of molten slag by pouring it into water to produce steam the steam has been very liable to contain injurious compounds more especially sulfur compounds and the object of this invention is to free the steam from such impurities.

According to this invention the liquid into which the slag is poured consists of water and milk of lime whereby the sulfurous acid is to a great extent absorbed. The steam is then passed through a stream of hot caustic soda solution and finally a small quantity of ammonia is introduced in order to neutralize any acid which may still be in the steam.

In the drawing which illustrates this invention $a$ is a slag spout leading from a furnace. The molten slag runs down $a$ and through a cone shaped tube $b$ the lower end of which is submerged in a tank $c$ containing water and milk of lime which may be agitated by a stirrer $d$. The slag on meeting the liquid is granulated, and is then extracted by an elevator $e$ and dropped into a second tank $f$ from which it is raised by an elevator $g$ which may discharge into trucks. The steam generated by the slag passes up a pipe $h$ into a tower $i$ where it meets a stream of hot caustic soda which flows through the perforated bottom of a container $k$ in the upper part of the tower. The caustic soda solution collects at $l$ and is circulated by a pump $m$ through a coil of pipes $n$ in the tank $c$ and returns to the container $k$ at a temperature of about 212° F. The caustic soda solution can be renewed and the spent liquor drawn off at any suitable point. The steam passes from the tower by a pipe $o$ and mingles with a small quantity of ammonia issuing from a vessel $p$ which neutralizes any acid remaining in the steam.

When the steam is used to drive a steam engine or turbine the ammonia and steam are condensed in the ordinary way and the water containing the condensed ammonia may be returned to the tank $c$ where the ammonia compounds are decomposed by the lime water so that the ammonia can be used over and over again. Any convenient means may be provided for supplying milk of lime to the tanks $c$ and $f$.

What I claim is:—

1. A process of generating steam which comprises the step of pouring molten slag into water to which milk of lime has been added.

2. A process of generating steam which comprises the steps of pouring molten slag into water to which milk of lime has been added and then subjecting the steam so formed to the action of caustic soda.

3. A process of generating steam which comprises the steps of pouring molten slag into water to which milk of lime has been added, subjecting the steam so formed to the action of caustic soda, and finally adding ammonia to the steam.

WALTER LYULPH JOHNSON.

Witnesses:
C. S. SMITH,
WM. FEATHERSTONE.

---

Copies of this patent may be obtained for five cents each, by addressing the "Commissioner of Patents, Washington, D. C."